United States Patent
Raveendran et al.

(10) Patent No.: US 9,166,633 B2
(45) Date of Patent: Oct. 20, 2015

(54) SYSTEMS AND METHODS FOR INTERFACING A WHITE SPACE DEVICE WITH A HOST DEVICE

(75) Inventors: Vijayalakshmi R. Raveendran, San Diego, CA (US); Yu A. Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 13/007,575

(22) Filed: Jan. 14, 2011

(65) Prior Publication Data

US 2011/0176602 A1   Jul. 21, 2011

Related U.S. Application Data

(60) Provisional application No. 61/297,166, filed on Jan. 21, 2010, provisional application No. 61/309,547, filed on Mar. 2, 2010.

(51) Int. Cl.
*H04N 7/30* (2006.01)
*H04N 5/38* (2006.01)
(Continued)

(52) U.S. Cl.
CPC .............. *H04B 1/034* (2013.01); *H04H 20/61* (2013.01); *H04H 60/43* (2013.01); *H04L 27/0006* (2013.01)

(58) Field of Classification Search
CPC ............... G06F 17/30864; G06F 17/30867; G06F 17/30011; G06F 9/541; G06F 9/547; G06F 9/54; G06F 9/4443; G06Q 10/10; G06Q 30/02; H04N 7/30; H04N 5/38; H04N 7/26244; H04N 7/50; H04N 7/26085; H04N 7/26106; H04L 29/06; H04L 12/26; H04J 1/00; H04J 3/16; H04W 4/00; H04H 20/67

USPC ............ 375/240.2, E07.226, 62, 68, 81, 100, 375/139, 151; 348/723, E05.093; 707/100, 707/736; 709/328, 202; 719/328; 725/117, 725/62, 68, 81, 100, 139, 151
See application file for complete search history.

(56) References Cited

U.S. PATENT DOCUMENTS 8,219,553 B2 * 7/2012 Bedingfield, Sr. ............ 707/736
8,307,398 B2 * 11/2012 Matz ............................... 725/62
(Continued)

FOREIGN PATENT DOCUMENTS

CA   2204455 A1   11/1998
CN   1754147 A    3/2006
(Continued)

OTHER PUBLICATIONS

International Search Report and Written Opinion—PCT/US2011/022090—ISA/EPO—Apr. 26, 2011.
(Continued)

*Primary Examiner* — Dave Czekaj
*Assistant Examiner* — Dramos I Kalapodas
(74) *Attorney, Agent, or Firm* — Donald Kordich

(57) ABSTRACT

Information is communicated from a host device to a receiving device via white space. A white space device is interfaced with the host device. The white space device has at least one port configured to communicatively interface with a host device to receive multimedia content from the host device. The white space device also optionally has a television band engine configured to encode a transport stream containing at least a portion of the multimedia content received from the host device. A transmitter is configured to transmit the transport stream via white space.

16 Claims, 6 Drawing Sheets

(51) Int. Cl.
*H04B 1/034* (2006.01)
*H04H 20/61* (2008.01)
*H04H 60/43* (2008.01)
H04N 7/167 (2011.01)
H04L 27/00 (2006.01)

(56) References Cited

U.S. PATENT DOCUMENTS

| | | | | |
|---|---|---|---|---|
| 8,387,885 | B2* | 3/2013 | Bennett et al. | 235/472.01 |
| 8,644,230 | B2* | 2/2014 | Henry | 370/329 |
| 8,699,411 | B1* | 4/2014 | Gossett et al. | 370/328 |
| 2003/0037181 | A1* | 2/2003 | Freed | 709/328 |
| 2003/0172127 | A1* | 9/2003 | Northrup et al. | 709/219 |
| 2006/0067354 | A1 | 3/2006 | Waltho et al. | |
| 2006/0084444 | A1 | 4/2006 | Kossi et al. | |
| 2006/0161555 | A1* | 7/2006 | Mazzaferri | 707/100 |
| 2008/0229335 | A1* | 9/2008 | Robbin et al. | 719/328 |
| 2009/0011729 | A1 | 1/2009 | Ikeda et al. | |
| 2009/0061783 | A1 | 3/2009 | Choi et al. | |
| 2009/0235316 | A1 | 9/2009 | Wu et al. | |
| 2009/0256922 | A1* | 10/2009 | Gersten et al. | 348/222.1 |
| 2009/0326815 | A1* | 12/2009 | Williamson et al. | 701/212 |
| 2010/0053454 | A1* | 3/2010 | Sugino et al. | 348/723 |
| 2010/0124254 | A1* | 5/2010 | Wu et al. | 375/131 |
| 2010/0182928 | A1* | 7/2010 | Wu et al. | 370/252 |
| 2010/0195667 | A1* | 8/2010 | Wang et al. | 370/466 |
| 2010/0202510 | A1* | 8/2010 | Kyle | 375/240.01 |
| 2010/0260336 | A1* | 10/2010 | Mulcahy | 380/210 |
| 2011/0002377 | A1* | 1/2011 | Raveendran | 375/240.01 |
| 2011/0013089 | A1* | 1/2011 | Adolphson et al. | 348/723 |
| 2011/0069720 | A1* | 3/2011 | Jacobs et al. | 370/466 |
| 2011/0176060 | A1* | 7/2011 | Lee et al. | 348/723 |
| 2012/0077466 | A1* | 3/2012 | O'Mahony et al. | 455/414.1 |
| 2012/0274859 | A1* | 11/2012 | Knutson et al. | 348/723 |

FOREIGN PATENT DOCUMENTS

| | | |
|---|---|---|
| CN | 1765059 A | 4/2006 |
| JP | 2006524877 A | 11/2006 |
| JP | 2008053830 A | 3/2008 |
| JP | 2013514036 A | 4/2013 |
| WO | WO-2004098079 A1 | 11/2004 |
| WO | 2006047064 A3 | 5/2006 |
| WO | WO-2007099631 A1 | 9/2007 |
| WO | WO-2011075154 A1 | 6/2011 |

OTHER PUBLICATIONS

Myung Sun"Song, et al., "Standardization of CogNeA on TV white spaces", Communications and Information Technology, 2009, ISCIT 2009, 9th International Symposium on, IEEE, Piscataway, NJ, USA, Sep. 28, 2009, pp. 820-823, XP031571204, ISBN: 978-1-4244-4521-9.

Segan, "What White Spaces Can Do for You", News and Analysis by PC Magazine, Nov. 6, 2008, 3 pages.

Mahony, "WHDI Podcast: Can WHDI Become the Video Version of WiFi?", WHDI Podcast, Dec. 20, 2009, 8 pages.

"Regarding White Space", Study Group on the Comprehensive Legal System for Communications and Broadcasting, 12th Meeting, Material 6, Ministry of Internal Affairs and Communications, Jan. 30, 2009, [Retrieved from the Internet: Jul. 11, 2013].

Taiwan Search Report—TW100102365—TIPO—Sep. 25, 2013.

\* cited by examiner

SYSTEMS AND METHODS FOR INTERFACING A WHITE SPACE DEVICE WITH A HOST DEVICE

CROSS-REFERENCE TO RELATED APPLICATIONS

This application claims the benefit of: 1) U.S. Provisional Patent Application No. 61/297,166 filed Jan. 21, 2010, and 2) U.S. Provisional Patent Application No. 61/309,547 filed Mar. 2, 2010, the disclosures of which are expressly incorporated by reference herein in their entireties.

BACKGROUND

1. Field

The present disclosure generally relates to communication of information from a host device to a receiving device via white space and, more specifically, to interfacing a white space device with a host device.

2. Background

The Federal Communications Committee (FCC) is an independent agency of the United States government that is charged with regulating all non-federal government use of the radio spectrum (including radio and television (TV) broadcasting), and all interstate telecommunications (wire, satellite and cable) as well as all international communications that originate or terminate in the United States. In 2008, the FCC issued rules approving the unlicensed signal operation in the unused TV channels (i.e., white space). However, this approved, unlicensed use is subject to protections set in place for the primary users of the TV band. The primary users of the TV band are ATSC/National Television System Committee (NTSC) transmitters, such as TV broadcasters, and licensed wireless microphones. The new rules allow wireless technologies to use the white space as long as the technology and any resulting signal transmissions do not interfere with the existing primary users. Thus, periodic sensing is required to detect other signals. For purposes of this disclosure, the various devices that utilize such technologies to access this white space will be referred to as "white space devices," "unlicensed devices," or the like.

Wireless delivery of content to televisions (TVs) and other monitors is desirable. As one example, it may be desirable, in some instances, to have content delivered from a user device for output on a TV device. For instance, as compared with many TV device output capabilities, many portable user devices, such as mobile telephones, personal data assistants (PDAs), media player devices (e.g., APPLE IPOD devices, other MP3 player devices, etc.), laptop computers, notebook computers, etc., have limited/constrained output capabilities, such as small display size, etc. A user desiring, for instance, to view a video on a portable user device may gain an improved multimedia experience if the video content were delivered for output on a TV device. Accordingly, a user may desire in some instances to deliver the content over white space from a user device for output on a monitor with an ATSC tuner (e.g., HDTV device) for an improved multimedia experience in receiving (e.g., viewing and/or hearing) the content. However, the transmission to the television device over white space requires sensing which would interfere with the multimedia experience.

SUMMARY

The present disclosure generally relates to communication of information from a host device to a receiving device via white space and, more specifically, to systems and methods for interfacing a white space device with a host device. In one embodiment, a white space device has at least one port configured to communicatively interface with a host device for receiving multimedia content from the host device. The white space device also has a transmitter configured to wirelessly transmit at least a portion of the received data via white space.

In one exemplary implementation, the ports are a PCIe port and a USB port. In another exemplary implementation, the ports are a DVI port and a USB port. In another exemplary implementation, the ports are an HDMI port and a USB port. In another exemplary implementation, the port are a VGA port and a USB port.

In one aspect, method includes communicatively interfacing, via at least one port, a white space device with a host device. The method also includes receiving, by the white space device, multimedia data from the host device via the at least one port. The method further includes wirelessly outputting, by the white space device, at least a portion of the data via white space.

In yet another aspect, a white space communication system has means for communicatively interfacing with a host device. The system also has means for receiving, via the interfacing means, multimedia content from the host device; and means for wirelessly outputting at least a portion of the received content via white space.

BRIEF DESCRIPTION OF THE DRAWINGS

For a more complete understanding of the present disclosure, reference is now made to the following description taken in conjunction with the accompanying drawings.

DETAILED DESCRIPTION

White space devices generally refer to unlicensed wireless transceivers that communicate over the unused spectrum in the television band. These devices generally operate in a cognitive manner in which the devices scan first to detect existing white space signals (e.g., Advanced Television Systems Committee (ATSC), National Television Systems Committee (NTSC), and certain wireless microphone protocols) from licensed primary users and then select unused channels in order to avoid interference with the licensed signals.

A white space device may be communicatively coupled with or integrated within a user device, and the white space device may thus deliver information (e.g., multimedia content) from the user device to a TV receiver device (e.g., a HDTV device) over white space. Exemplary implementations of a white space device are described further herein. However, various implementations of such a white space device are possible, and any implementation of a white space device operable to deliver information from a user device over white space is within the scope of the present disclosure.

Figure 1:
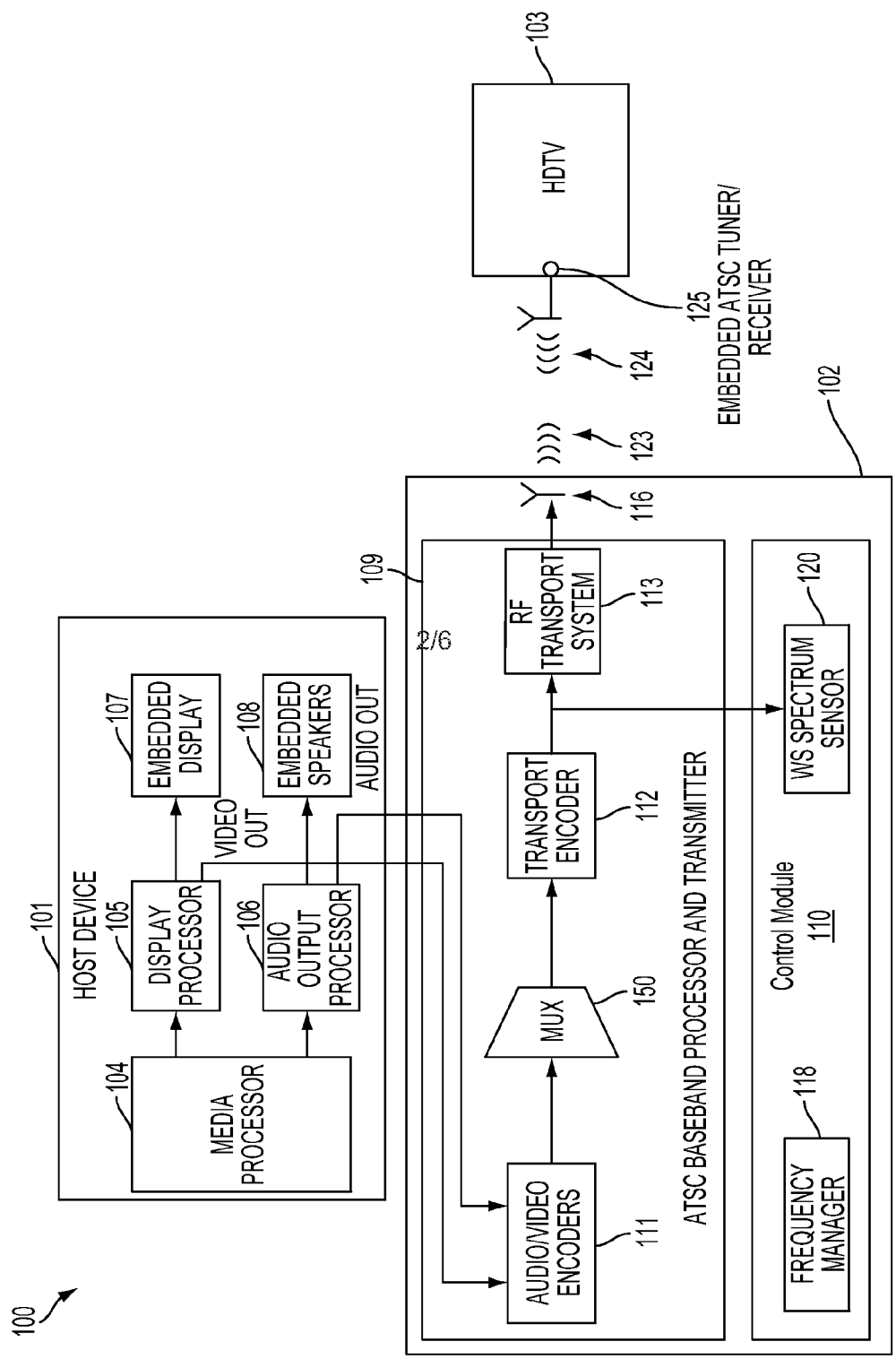
FIG. 1 is an illustration of an exemplary system within which embodiments of the present disclosure may be implemented.

FIG. 1 is an illustration of an exemplary system 100 within which embodiments of the present disclosure may be implemented. The system 100 includes an exemplary user device 101, which may be referred to as a "host" device. An exemplary implementation of the user device 101 is shown in a block-diagram form in FIG. 1. In the illustrated example, the user device 101 is shown as a mobile device, but in other embodiments the user device 101 need not be a mobile device. The exemplary user device 101 generally includes one or more processors, such as a media processor 104, display processor 105, and/or audio output processor 106, and the user device 101 may have embedded input/output devices, such as an embedded display 107 and embedded speakers 108. Of course, the user device 101 may be configured differently in a given implementation (e.g., include different and/or additional functional blocks than those shown in FIG. 1), and any such implementation is within the scope of the present disclosure.

The user device 101 is generally operable to generate content, which may be output via its embedded output devices (e.g., embedded display 107 and speakers 108). Various types of content are well known in the art for being output on user devices, and any such content may be output on the user device 101 in a given application. For instance, a multimedia player application may be executing on the user device 101 to output multimedia content (e.g., a movie, etc.). Of course, other content, such as textual content and/or other graphical/image and/or audio content (e.g., email content, web browsing content, video gaming content, word processing content, etc.) may be output in a given application with which a user may be interacting via the user device 101.

The user may be inputting information to the user device 101 (e.g., for interacting with an application executing thereon) via one or more human interface input device(s) (not shown in FIG. 1), such as a pointer device (e.g., mouse), joystick, keyboard, touch-screen interface, microphone, etc. In some instances, such user input information may result in some output being generated or modified. For instance, input of a user's mouse movement may result in corresponding movement of a pointer on an embedded display 107 of the user device 101.

Also included in the exemplary system 100 is a white space device 102, an exemplary implementation of which is shown in a block-diagram form in FIG. 1. The white space device 102 is communicatively coupled with the user device 101 for receiving information from such user device 101. In one embodiment, the white space device 102 is a separate device, which may be referred to as a "dongle," that is communicatively coupled with the user device 101. The white space device 102 may be coupled via a USB connection, PCIe interface, or in any suitable manner that allows for information from the user device 101 to be captured by the white space device 102 as discussed further herein. For example, the white space device 102 may be communicatively coupled with the user device 101 via any suitable type of wired connection or via a wireless communication connection, such as wireless USB (WUSB), Bluetooth, 802.11, etc.

The white space device 102 captures information from the user device 101. For instance, the captured information includes content that is to be output via an output device, such as "video out" 126 and/or "audio out" 127, as shown in FIG. 1. As discussed further herein, other information may also be captured by the white space device 102 in certain embodiments, such as "human interface device" (HID) data, e.g., user-input commands (e.g., mouse movements, joystick movements, keyboard input, and/or other commands received via human interface device(s)). The white space device 102 is operable to wirelessly transmit by a transmitter 116 over wireless communication 123, via white space, information captured from the user device 101 to, for instance, allow the content (e.g., multimedia content) captured from the user device 101 to be received and output by a TV device, such as the HDTV 103 shown in FIG. 1.

In the illustrated example of FIG. 1, the white space device 102 transmits Advanced Television Systems Committee (ATSC) signals over the air on a white space channel, thereby effectively acting as a television station transmitter. Thus, as shown in block diagram form, the exemplary white space device 102 of FIG. 1 includes an ATSC baseband processor and transmitter 109. As is known in the art, ATSC is compatible with the well-known MPEG-2 Transport Stream (TS), and thus the exemplary white space device 102 includes audio/video decoders 111, e.g., MPEG-2/AC-3, for encoding the captured information from the user device 101. The encoded data is transmitted via a multiplexer 150 to a transport encoder 112, e.g., an MPEG-2 TS encoder. Subsequently, transport stream packets are sent to an RF transmission system 113 (and a transmitter (e.g., antenna) 116) for wireless transmission via white space 123. In other embodiments, the transport stream is a Real-time Transport Protocol (RTP) transport stream, or a Transport Control Protocol (TCP) stream.

The HDTV 103 includes an embedded wireless receiver 124 and ATSC tuner/receiver (e.g., a conventional television tuner) 125 such that it can receive and process the ATSC signals (e.g., the MPEG-2 TS) for output to the display and/or speakers of the HDTV device 103.

The exemplary white space device 102 of FIG. 1 further includes a control module 110 that has a white space spectrum sensor 120 for sensing the white space (e.g., for sensing signals within the TV whitespace). Such sensor 120 periodically performs sensing to determine the available white space. Frequency manager logic 118 can adjust the channel when needed to maintain the white space device's transmission within the determined available white space. As discussed further herein, embodiments are provided for inconspicuously quieting the transmitter 116 to enable the sensor 120 to perform its sensing during such quieting to improve the quality of sensing being performed Of course, ATSC is only one example of a set of television transmission standards that can be employed by the white space device 102, and in other embodiments any of a variety of television standards, such as ATSC standards, Digital Video Broadcasting (DVB) standards, Integrated Services Digital Broadcasting (ISDB) standards, Digital Multimedia Broadcast (DMB) standards, and the like can be employed to transmit media content over white space.

As mentioned above, the exemplary white space device 102 of FIG. 1 converts the information captured from user device 101 to a transport stream (e.g., MPEG-2) for transmission, which is compatible with ATSC and thus can be received and processed by the ATSC receiver/tuner 125 of HDTV 103.

Figure 2:
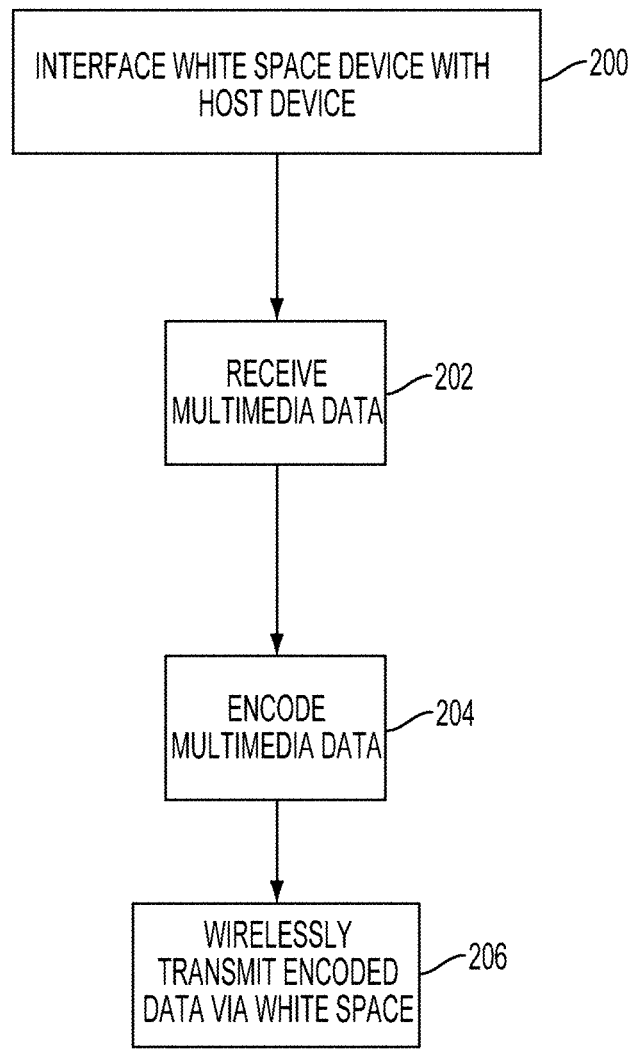
FIG. 2 shows an exemplary operational flow in accordance with one aspect of the present disclosure.

An exemplary data flow for converting information (e.g., HDMI, DP, VGA, etc.) captured from the user device 101 into a MPEG-2 transport stream for transmission via ATSC white space is shown in FIG. 2.

According to embodiments of the present disclosure, any of various different interfaces may be employed for interfacing the white space device 102 with a host device 101 for facilitating wireless output of information from the host device 101 via white space. For instance, according to certain embodiments, an interface component or device may be implemented (e.g., as part of a front-end capture portion of white space device 102) to interface with a host device 101. As discussed above, the white space device 102 may provide a TV band engine (e.g., ATSC engine) for encoding audio, display, and/or other data and an RF integrated circuit for transmitting the encoded data from the host device 101 over white space for receipt by a receiving device (e.g., HDTV 103). The interface between the host device 101 and the white space device 102 may, as discussed further hereafter, enable communication of content (e.g., multimedia content) from the host device to the white space device 102, which can then communicate such content via white space. In addition, in certain embodiments, the interface may further enable communication of control signals and/or power between the host device 101 and the white space device 102.

Due, for example, to the limited user interface capabilities (e.g., limited display size, etc.) of many host devices 101, such as with many portable multimedia devices, it may be desirable to output video, audio, and/or other data (e.g., control signals) from such host device 101 to a TV device (e.g., a HDTV device 103). Many host devices 101 do not themselves include functionality for wirelessly outputting information over white space. Accordingly, the white space device 102 may be interfaced with the host device 101 to gain the TV band engine functionality.

Various different implementations for interfacing such a white space device 102 with a host device 101 are possible, and a desired implementation selected for use with a given host device 101 may depend, at least in part, on the interfaces natively available on the given host device 101. Further, in certain embodiments, the white space device 102 may be coupled with the host device 101 not only to allow for capture of data, such as video, audio, and/or other data (e.g., control signals, etc.), but also to allow for receipt of power from the host device 101. Thus, for instance, in certain embodiments, the white space device 102 also receives at least a portion of its power (e.g., power for charging an internal battery of the white space device 102) from the host device 101.

Referring now to FIG. 2, an exemplary process will be described. At block 200, a white space device is communicatively interfaced with a host device. In one embodiment, the interfacing is via a port. In another embodiment, a white space module is engaged. Such a module is embedded within the host device 101, rather than being a separate module as described elsewhere, for the sake of simplicity.

At block 202, the white space device receives multimedia data from the host device via the at least one port. At block 204, the data is encoded, for example into an MPEG-2 transport stream. At block 206, the white space device wirelessly outputs at least a portion of the encoded data via white space.

Various exemplary interface implementations according to embodiments of this disclosure are described further below in connection with FIGS. 3-6.

Figure 3:
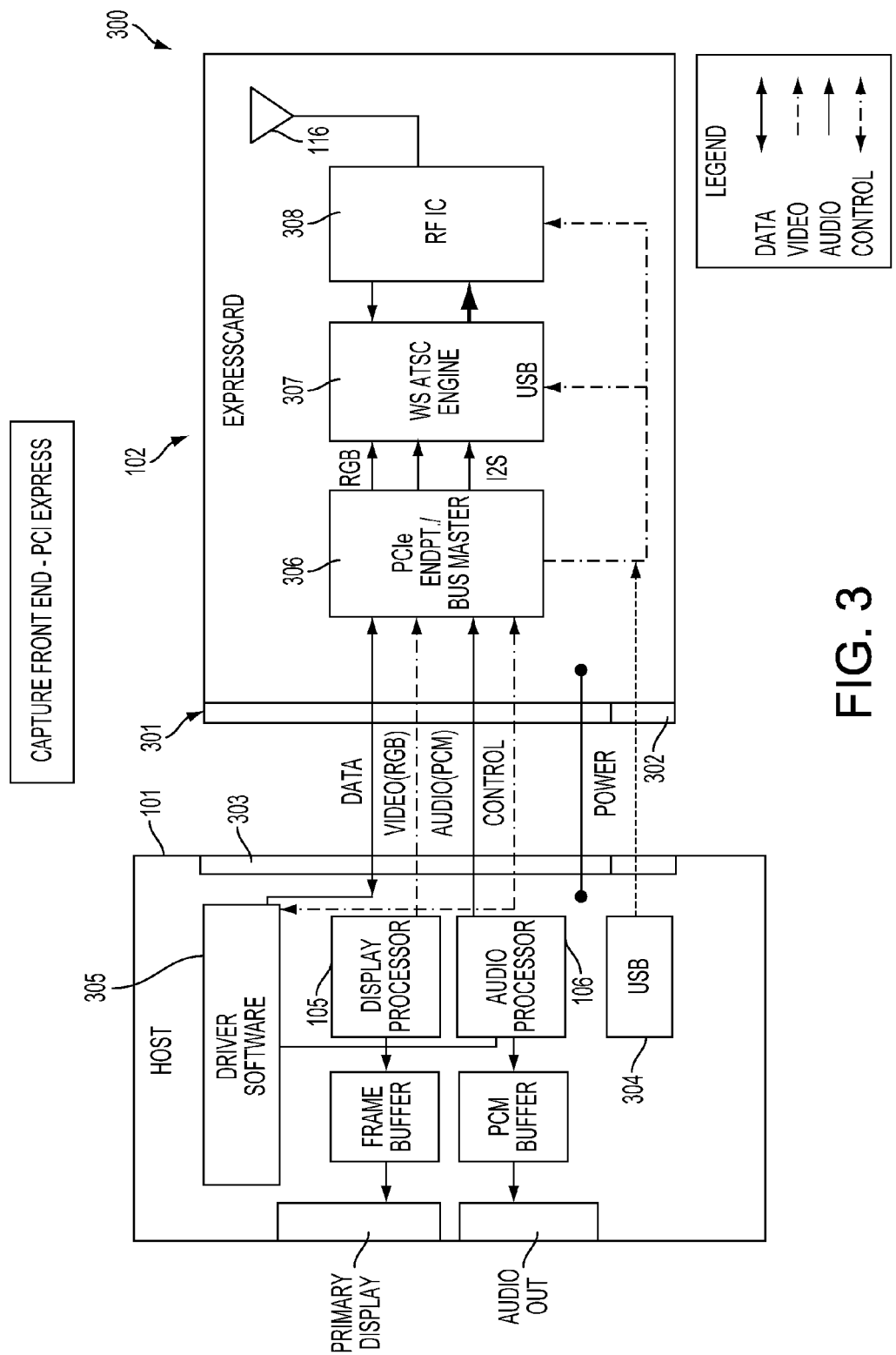
FIG. 3 is an illustration of an exemplary system in which a white space device interfaces with a host device via a PCIe and/or USB connection according to one embodiment of the present disclosure.

PCIe/Express Card Implementation:

FIG. 3 shows an exemplary system 300 that includes a host device 101 having a peripheral component interconnect express (PCIe) interface 303. An exemplary implementation of the white space device 102 is also shown, implemented as a PCI express card, which interfaces with the host device 101 via a PCIE/Express Card interface 301. That is, the PCIe interface 301 of the white space device 102 communicatively couples with a PCIe interface 303 of the host device 101. As shown, various information may be captured from host device 101 by the white space device 102 via the PCIe interface 301/303, such as data, video (in red green blue (RGB) format), audio (in pulse code modulation (PCM) format), and/or control signals (e.g., human interface device commands, such as mouse movements, etc.). Power may also be drawn from the host device 101 by the white space device 102 via the PCIe interface 301/303. For instance, in one exemplary implementation, 3.3 W of power is drawn via the PCIe interface.

In this example, a universal serial bus (USB) interface may also be implemented and available for use in coupling with a given host device 101 in addition to or instead of using the PCIe interface 301/303. For instance, the host device 101 may also include a USB interface 304, and the white space device 102 may also be implemented to include a USB interface 302 for coupling with the USB interface 304 of the host device 101. The USB interface 302/304 may be used, along with the PCIe connection 301/303, for connecting the white space device 102 with the host device 101 to increase bandwidth (e.g., for communication of information, such as control signal, audio, and/or other data communication) and/or to increase the power draw from the host device 101. In one exemplary implementation, the USB interface 302/304 enables increased bandwidth for communication of control and audio data being captured from the host device 101, and the USB interface 302/304 also allows for additional power draw from the host device 101. For instance, in one exemplary implementation, an additional 1.1 W is drawn via the USB interface 302/304, which when added to the 3.3 W of power drawn via the PCIe interface 301/303 enables support of up to 4.4 W of power.

A driver (e.g., software) 305 is implemented on the host device 101, which may be downloaded via the Internet, loaded from the white space device 102 (e.g., via the PCIe and/or USB interface), or otherwise installed on the host device 101. The driver 305 is operable on the host device 101 for intercepting raw data (e.g., video, audio, and/or control signals) from the host device processors (e.g., the display processor 105 and audio processor 106) before the raw data is sent to a PCM buffer (and subsequent audio output) and frame buffer (and subsequent primary display). The driver 305 sends the data (via the PCIe and/or USB interface) to the white space device 102 for external rendering. The white space device 102 provides an encoder including a TV band engine (e.g., ATSC engine 307 in this example) for processing the captured data to encode a transport stream (e.g., a MPEG-2 transport stream) for outputting the data wirelessly (via the radio frequency (RF) integrated circuit (IC) 308) over white space. Accordingly, a TV device having an ATSC receiver/tuner (e.g., HDTV 103 of FIG. 1) can receive the data for output on the TV device.

In one exemplary implementation, the power drawn by the white space device 102 from host device 101 may be sufficient for supporting operation of the white space device 102. For instance, in one exemplary implementation, the operation of the PCIe endpoint/bus master (e.g., PLX) block 306 of the white space device 102 may require an estimated 0.75 W, the white space ATSC engine 307 may require an estimated 0.5 W, and the RF IC transmitter 308 may require an estimated 0.2 W, thus totaling an estimated 1.55 W of power required. As mentioned above, the power draw from the PCIe interface 301/303 may be 3.3 W, and the power draw when also drawing an additional 1.1 W from the USB interface 302/304 is 4.4 W. Thus, the power draw from the host device 101 may be sufficient for powering the operations of the white space device 102 in certain implementations. Of course, in other implementations the white space device 102 may require further power source(s), such as an internal battery supply and/or charging unit.

Figure 4:
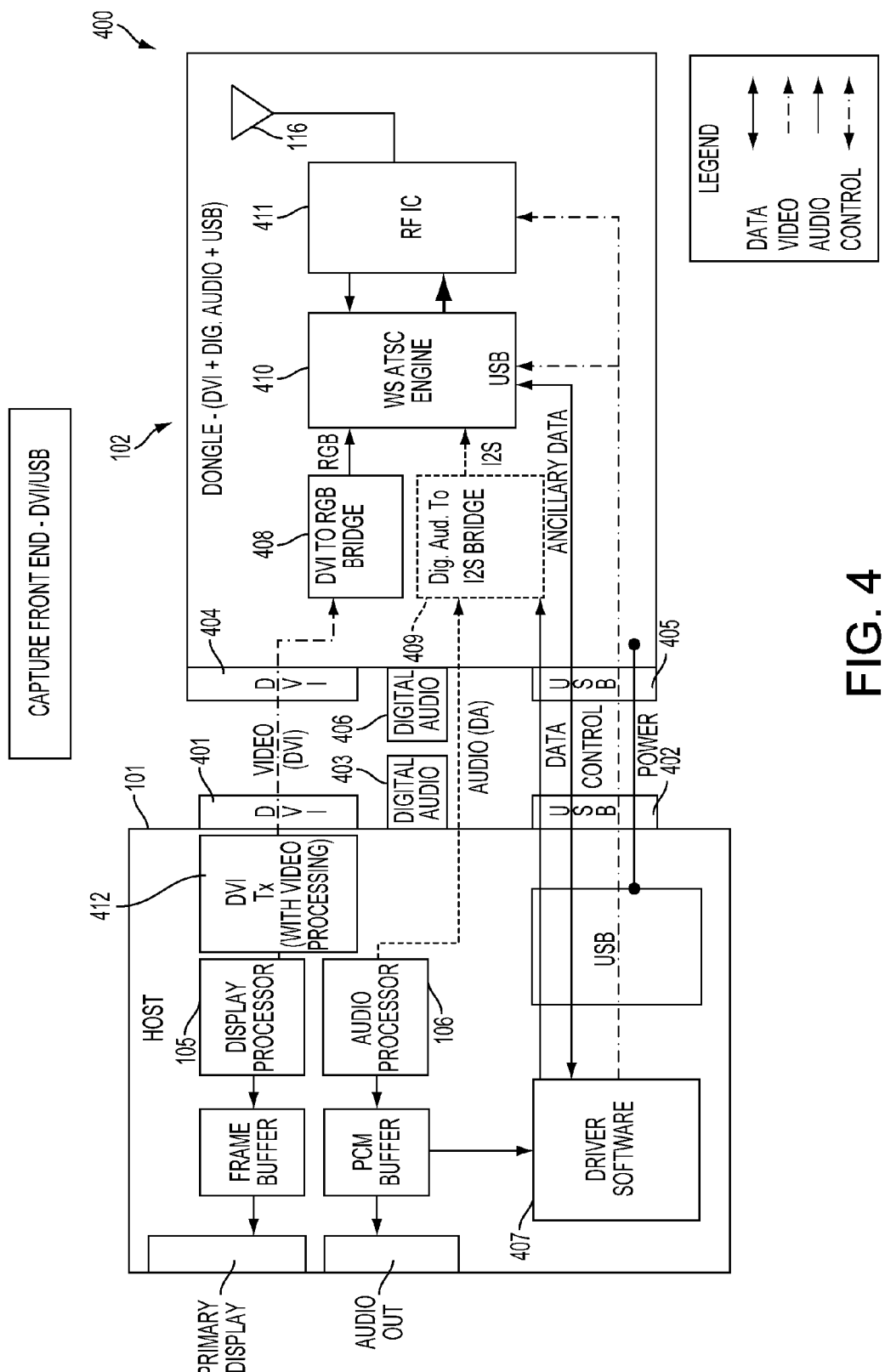
FIG. 4 is an illustration of an exemplary system in which a white space device interfaces with a host device via a DVI, Digital Audio, and/or USB connection according to one embodiment of the present disclosure.

DVI/USB Implementation:

FIG. 4 shows an exemplary system 400 that includes a host device 101 having a digital visual interface (DVI) interface 401 and USB interface 402, and may also include a digital audio interface (DA) 403. An exemplary implementation of the white space device 102 is also shown, which interfaces with the host device 101 via the DVI interface 404 and a USB interface 405, and in some instances (e.g., when host device 101 includes the DA interface 403) may also connect via a DA interface 406. As shown, various information may be captured from the host device 101 by the white space device 102 via the interfaces. For instance, digital video is transmitted via the DVI interface 401/404; and digital audio may be transmitted via the DA interface 403/406. Further, various information may be captured via the USB interface 402/405, such as data and/or control signals (e.g., human interface device commands, such as mouse movements, etc.). The USB interface 402/405 may be used, along with the DVI interface 401/404 and/or DA interface 403/406, for connecting the white space device 102 with the host device 101 to increase bandwidth (e.g., for communication of information, such as control signal, audio, and/or other data communication).

Audio can either be captured via the digital audio (DA) port or extracted from the PCM buffer and transported via the USB interface 402/405 in this exemplary implementation of FIG. 4. In this example the video output is via the DVI transmit device 412 of the host device 101. The DVI transmit device 412 intercepts the raw data from the display processor and modifies native video data from the host device 101 to conform to DVI supported video formats The resulting data does not reflect graphical data characteristics of RGB data output of mobile devices (e.g., smartbooks, smartphones, etc.).

The DVI formatted data is received in the white space device 102 and converted to RGB data. Such conversion could occur in a well known application specific integrated circuit (ASIC) 408. Similarly, the received digital audio is converted to an integrated interchip sound (I²S) format with a well known application specific integrated circuit (ASIC) 409. The white space ATSC engine 410 then encodes the converted data, for example into an MPEG-2 transport stream, for processing by the RF IC 411 and transmission to the TV device 103 via white space.

Power may also be drawn from host device 101 by the white space device 102 via the USB interface 402/405. For instance, in one exemplary implementation, 1.1 W of power is drawn via the USB interface 402/405.

A driver (e.g., software) 407 is implemented on the host device 101, which may be downloaded via the Internet, loaded from the white space device 102 (e.g., via the USB interface 402/405), or otherwise installed on the host device 101. The driver 407 is operable on the host device 101 for intercepting certain information and/or managing/controlling output of such information (e.g., audio, and/or control signals) from the host device processors and/or buffers and sending the information (via the interface(s)) to the white space device 102. In particular, the driver 407 may be implemented to capture audio data from the PCM buffer and/or to capture control signals (e.g., HID command data) and send the captured information via the USB interface 402/405 to the white space device 102. In another embodiment, the audio is retrieved from a digital audio port without use of the driver 407.

The white space device 102 provides a TV band engine (e.g., ATSC engine 410 in this example) for processing the captured data (received via the DVI, DA, and/or USB interfaces) to encode a transport stream (e.g., a MPEG-2 transport stream) for outputting the data wirelessly (via the RF IC 411) over white space. Accordingly, a TV device having an ATSC receiver/tuner (e.g., HDTV 103 of FIG. 1) can receive the data for output on the TV device.

In one exemplary implementation, at least a portion of the power required for operation of the white space device 102 may be drawn from host device 101 (e.g., via the USB interface 402/405), but of course additional power may be provided via an on-board battery and/or other power source of the white space device 102. For instance, in one exemplary implementation, the operation of the DVI to RGB bridge device 408 of the white space device 102 may require an estimated 1 W, the white space ATSC engine 410 may require an estimated 0.5 W, and the RF IC 411 may require an estimated 0.2 W, thus totaling an estimated 1.7 W of power required. As mentioned above, the power draw from the USB interface 402/405 may be 1.1 W, and thus additional power required for operation of this exemplary implementation of the white space device 102 may be drawn from another power source, such as an on-board battery supply and/or charging unit of the white space device 102 (not shown in FIG. 4). In another embodiment, power consumption is reduced, for example by reducing performance, such as the frames per second (fps) from 30 fps to 24 fps or resolution (e.g., to 720 p).

Figure 5:
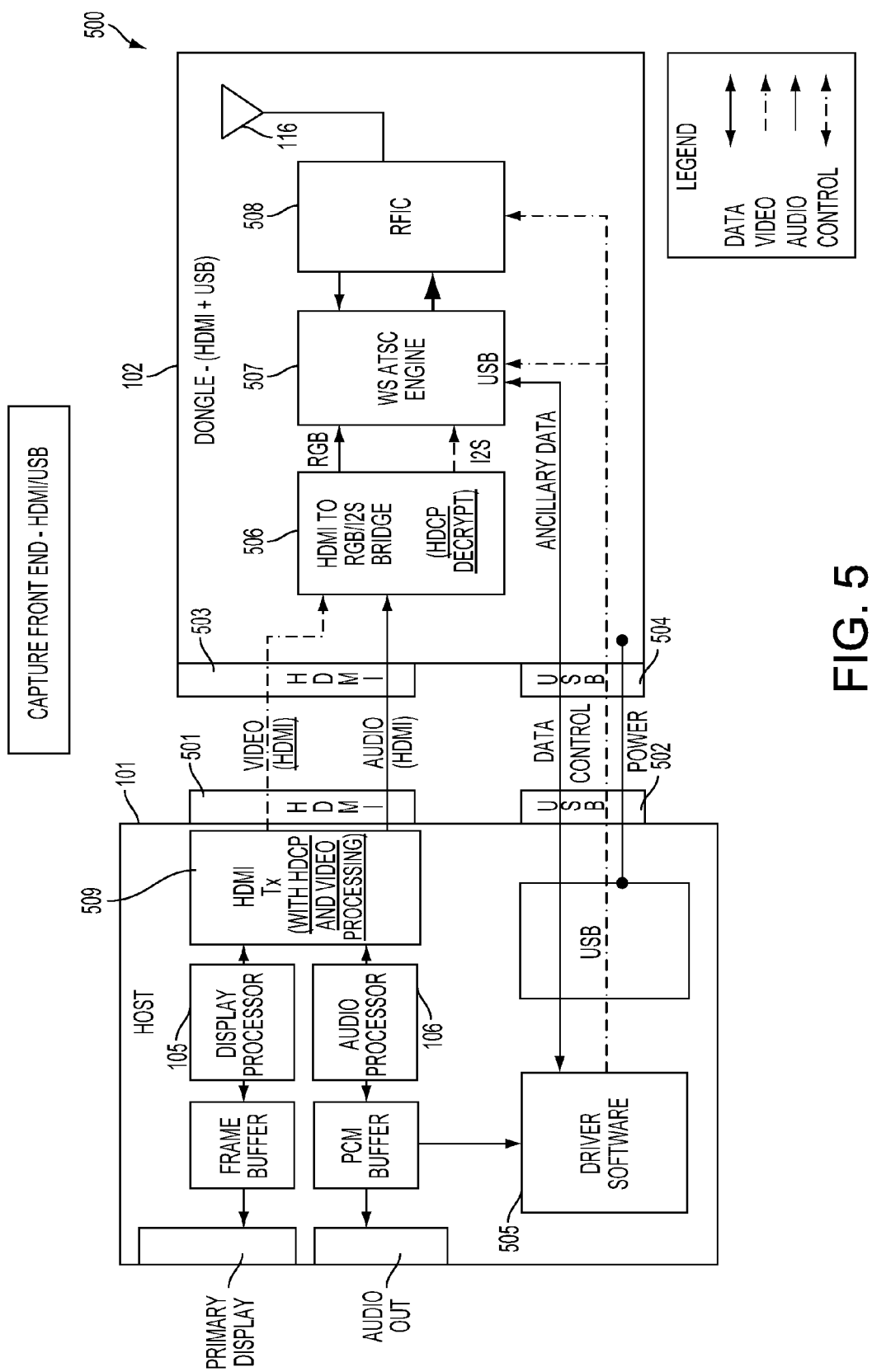
FIG. 5 is an illustration of an exemplary system in which a white space device interfaces with a host device via a HDMI and/or USB connection according to one embodiment of the present disclosure.

HDMI/USB Implementation:

FIG. 5 shows an exemplary system 500 that includes a host device 101 having a high definition multimedia interface (HDMI) interface 501 and a USB interface 502. An exemplary implementation of the white space device 102 is also shown, which interfaces with the host device 101 via an HDMI interface 503 and a USB interface 504. As shown, various information may be captured from the host device 101 by the white space device 102 via the interfaces. For instance, video and/or audio may be captured via the HDMI interface 501/503. HDMI provides embedded audio. In this example, the video output is via the HDMI transmit device 509 of the host device 101. The HDMI transmit device intercepts the data directly from the display processor 105 and audio processor 106 and modifies native data from the host device 101 to conform to HDMI supported formats The resulting data does not reflect graphical data characteristics of RGB data output of mobile devices (e.g., smartbooks, smartphones, etc.). The HDMI transmit device 509 may encrypt all data with high bandwidth digital content protection (HDCP) on certain host devices (for high definition), and thus corresponding decryption logic may be implemented on the white space device 102 in certain implementations.

The HDMI formatted data is received in the white space device 102 and converted to RGB data and I²S data. Such conversion could occur in a well known application specific integrated circuit (ASIC) 506. The ASIC 506 could also include the decrypting capabilities. The white space ATSC engine 507 then encodes the converted data, for example into an MPEG-2 transport stream, for processing by the RF IC 508 and transmission to the TV device 103 via white space.

In this example, a USB interface (502/504) may also be implemented and available for use in coupling with host device 101 in addition to the HDMI interface 501/503. The USB interface 502/504 may be used, along with the HDMI connection, for connecting the white space device 102 with the host device 101 to increase bandwidth (e.g., for communication of information, such as control signal, audio, and/or other data communication) and/or to enable power draw from the host device 101. Audio can either be captured via the HDMI port or extracted from the PCM buffer (with the driver 505) and transported via the USB interface 502/504 in this exemplary implementation of FIG. 5.

Power may also be drawn from host device 101 by the white space device 102 via the USB interface 502/504. For instance, in one exemplary implementation, 1.1 W of power is drawn via the USB interface 502/504.

A driver (e.g., software) 505 is implemented on the host device 101, which may be downloaded via the Internet, loaded from the white space device 102 (e.g., via the USB interface 502/504), or otherwise installed on the host device 101. The driver 505 is operable on the host device 101 for intercepting certain information and/or managing/controlling output of such information (e.g., audio, and/or control signals) from the host device processors and/or buffers and sending the information (via the interface(s)) to the white space device 102. In particular, the driver 505 may be implemented to capture audio data from the PCM buffer and/or to capture control signals (e.g., HID command data) and send the captured information via the USB interface 502/504 to the white space device 102. The white space device 102 provides a TV band engine (e.g., ATSC engine 507 in this example) for processing the captured data (received via the HDMI and/or USB interfaces) to encode a transport stream (e.g., a MPEG-2 transport stream) for outputting the data wirelessly (via the RF IC 508) over white space. Accordingly, a TV device having an ATSC receiver/tuner (e.g., HDTV 103 of FIG. 1) can receive the data for output on the TV device.

In one exemplary implementation, at least a portion of the power required for operation of the white space device 102 may be drawn from host device 101 (e.g., via the USB interface 502/504), but of course additional power may be provided via an on-board battery and/or other power source of the white space device 102. For instance, in one exemplary implementation, the operation of the HDMI to RGB transmit device 506 of the white space device 102 may require an estimated 2 W, the white space ATSC engine 507 may require an estimated 0.5 W, and the RF IC 508 may require an estimated 0.2 W, thus totaling an estimated 2.7 W of power required. As mentioned above, the power draw from the USB interface 502/504 may be 1.1 W, and thus additional power required for operation of this exemplary implementation of the white space device 102 may be drawn from another power source, such as an on-board battery supply and/or charging unit implemented within white space device 102 (not shown in FIG. 5). In another embodiment, power consumption is reduced, for example by reducing performance, such as the frames per second (fps) from 30 fps to 24 fps or resolution (e.g., to 720 p).

Figure 6:
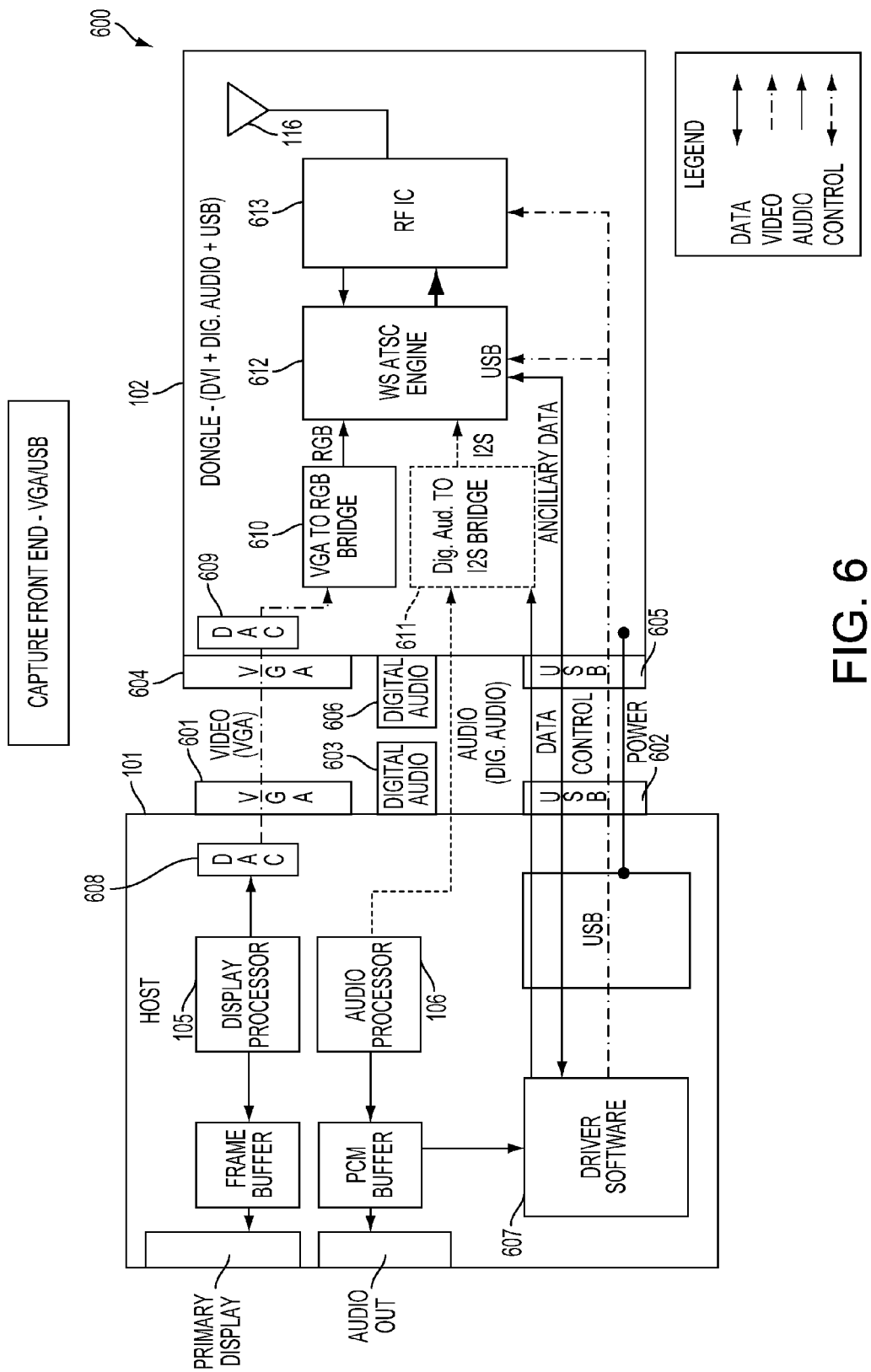
FIG. 6 is an illustration of an exemplary system in which a white space device interfaces with a host device via a VGA, Digital Audio, and/or USB connection according to one embodiment of the present disclosure.

VGA/USB Implementation:

FIG. 6 shows an exemplary system 600 that includes a host device 61 having a video graphics array (VGA) interface 601 and a USB interface 602, and may also include a digital audio interface (DA) 603. An exemplary implementation of the white space device 102 is also shown, which interfaces with the host device 101 via a VGA interface 604 and a USB interface 605, and in some instances (e.g., when the host device 101 includes the DA interface 603) may also connect via the DA interface 606. As shown, various information may be captured from the host device 101 by the white space device 102 via the interfaces. For instance, video is captured via the VGA interface 601/604; and digital audio may be captured via the DA interface 603/606. Further, various information may be captured via the USB interface 602/605, such as data and/or control signals (e.g., human interface device commands, such as mouse movements, etc.). The USB interface 602/605 may be used, along with the VGA and/or DA interfaces, for connecting the white space device 102 with the host device 101 to increase bandwidth (e.g., for communication of information, such as control signal, audio, and/or other data communication).

VGA is analog video, and quality, particularly with respect to text readability may be impacted due to digital to analog conversion (608) followed by analog to digital conversion (609). Audio can either be captured via the digital audio (DA) port (or via an analog audio port) or extracted from the PCM buffer and transported via the USB interface 602/605 in this exemplary implementation of FIG. 6.

Power may also be drawn from host device 101 by the white space device 102 via the USB interface 602/605. For instance, in one exemplary implementation, 1.1 W of power is drawn via the USB interface 602/605.

The VGA formatted data is received in the white space device 102 and converted to RGB data. Such conversion could occur in a well known application specific integrated circuit (ASIC) 610. Similarly, the received digital audio is converted to an integrated interchip sound ($I^2S$) format with a well known application specific integrated circuit (ASIC) 611. The white space ATSC engine 612 then encodes the converted data, for example into an MPEG-2 transport stream, for processing by the RF IC 613 and transmission to the TV device 103 via white space.

A driver (e.g., software) 607 is implemented on the host device 101, which may be downloaded via the Internet, loaded from the white space device 102 (e.g., via the USB interface 602/605), or otherwise installed on the host device 101. The driver 607 is operable on host device 101 for intercepting certain information and/or managing/controlling output of such information (e.g., audio, and/or control signals) from the host device processors and/or buffers and sending the information (via the interface(s)) to the white space device 102. In particular, the driver 607 may be implemented to capture audio data from the PCM buffer and/or to capture control signals (e.g., HID command data) and send the captured information via the USB interface 602/605 to the white space device 102. The white space device 102 provides a TV band engine (e.g., ATSC engine 612 in this example) for processing the captured data (received via the VGA, DA, and/or USB interfaces) to encode a transport stream (e.g., a MPEG-2 transport stream) for outputting the data wirelessly (via the RF IC 613) over white space. Accordingly, a TV device having an ATSC receiver/tuner (e.g., HDTV 103 of FIG. 1) can receive the data for output on the TV device.

In one exemplary implementation, at least a portion of the power required for operation of the white space device 102 may be drawn from host device 101 (e.g., via the USB interface 602/605), but of course additional power may be provided via an on-board battery and/or other power source of the white space device 102. For instance, in one exemplary implementation, the operation of the VGA to RGB bridge device 610 of the white space device 102 may require an estimated 1 W, the white space ATSC engine 612 may require an estimated 0.5 W, and the RF IC 613 may require an estimated 0.2 W, thus totaling an estimated 1.7 W of power required. As mentioned above, the power draw from the USB interface 602/605 may be 1.1 W, and thus additional power required for operation of this exemplary implementation of the white space device 102 may be drawn from another power source, such as an on-board battery supply and/or charging unit implemented on white space device 102 (not shown in FIG. 6). In another embodiment, power consumption is reduced, for example by reducing performance, such as the frames per second (fps) from 30 fps to 24 fps or resolution (e.g., to 720 p).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A white space device comprising:
   at least one port for communicatively interfacing with a host device to receive multimedia data from the host device, the multimedia data being optionally displayed at the host device while being received via the at least one port, the multimedia data being received in response to a user input received at the host device;
   an encoder coupled with a multiplexer and physically encased in the white space device as a single physical unit comprising a short communication interface between the encoder and the at least one port, to encode at least a portion of the received multimedia data into a transport stream;
   a white space spectrum controller to determine available white space spectrum periodically while quieting a transmitter and to adjust a transmission channel dynamically to maintain the transport stream, based at least in part on the determination; and
   the transmitter to wirelessly output at least the transport stream encoded from the portion of the received multimedia data via white space.

2. The device of claim 1, in which the encoder comprises a television band engine configured to encode the multimedia data prior to transmitting.

3. The device of claim 1 in which the at least one port comprises a peripheral component interconnect express (PCIe) port, a digital visual interface (DVI) port, a Digital Audio port, a high definition multimedia interface (HDMI) port, a video graphics array (VGA) port, a universal serial bus (USB) port, or a combination thereof.

4. The device of claim 1 in which the at least one port comprises:
- a peripheral component interconnect express (PCIe) port; and
- a universal serial bus (USB) port.

5. The device of claim 1 in which the at least one port comprises:
- a digital visual interface (DVI) port; and
- a universal serial bus (USB) port.

6. The device of claim 1 in which the at least one port comprises:
- a high definition multimedia interface (HDMI) port; and
- a universal serial bus (USB) port.

7. The device of claim 1 in which the at least one port comprises:
- a video graphics array (VGA) port; and
- a universal serial bus (USB) port.

8. The device of claim 1 in which the at least one port comprises:
- a digital visual interface (DVI) port;
- a Digital Audio port; and
- a universal serial bus (USB) port.

9. The device of claim 1 in which the at least one port comprises:
- a video graphics array (VGA) port;
- a Digital Audio port; and
- a universal serial bus (USB) port.

10. The device of claim 1 in which the at least one port communicatively interfaces with the host device for receiving control signals from the host device.

11. The device of claim 2 in which the television band engine comprises:
- an advanced television systems committee (ATSC) engine configured to wirelessly output the at least a portion of the received data via the white space.

12. A method comprising:
- communicatively interfacing, via at least one port, a white space device with a host device;
- receiving, by the white space device, multimedia data from the host device via the at least one port, the multimedia data being optionally displayed at the host device while being received via the at least one port, the multimedia data being received in response to a user input received at the host device;
- encoding, at an encoder coupled with a multiplexer and physically encased in the white space device as a single physical unit comprising a short communication interface between the encoder and the at least one port, at least a portion of the multimedia data into a transport stream;
- determining, at a white space spectrum controller, available white space spectrum periodically while quieting a transmitter and adjusting a transmission channel dynamically to maintain the transport stream, based at least in part on the determination; and
- wirelessly outputting, by the white space device, at least the transport stream encoded from the portion of the multimedia data via white space.

13. The method of claim 12 further comprising encoding the multimedia data.

14. The method of claim 13 in which the encoding comprises:
- encoding, by the white space device, an MPEG-2 transport stream containing the at least a portion of the received data.

15. The method of claim 13 in which the encoding comprises:
- encoding, by the white space device, one of a Real-time Transport Protocol (RTP) transport stream and a Transport Control Protocol (TCP) stream containing the at least a portion of the received data.

16. A computer program product for wireless communications, the computer program product comprising:
- a non-transitory computer-readable medium having program code recorded thereon, the program code comprising:
  - program code to interface, via at least one port, a white space device with a host device;
  - program code to receive multimedia data from the host device via the at least one port, the multimedia data being optionally displayed at the host device while being received via the at least one port, the multimedia data being received in response to a user input received at the host device;
  - program code to encode, at an encoder coupled with a multiplexer and physically encased in the white space device as a single physical unit comprising a short communication interface between the encoder and the at least one port, at least a portion of the multimedia data into a transport stream;
  - program code to determine at a white space spectrum controller available white space spectrum periodically while quieting a transmitter and to adjust a transmission channel dynamically to maintain the transport stream, based at least in part on the determination; and
  - program code to wirelessly output at least the transport stream encoded from the portion of the multimedia data via white space.

* * * * *